United States Patent Office 3,355,490
Patented Nov. 28, 1967

3,355,490
PROCESS OF MANUFACTURING CYCLOHEXYLAMINES
Frederik H. Van Munster, Waukegan, Ill., assignor to Abbott Laboratories, Chicago, Ill., a corporation of Illinois
No Drawing. Filed Aug. 19, 1964, Ser. No. 390,719
8 Claims. (Cl. 260—563)

ABSTRACT OF THE DISCLOSURE

N-alkyl-(or N,N-dialkyl)-cyclohexylamine or methyl-cyclohexylamine are prepared from phenol, a primary or a secondary alkylamine and hydrogen in the presence of rhodium or palladium as the catalyst.

---

The present invention relates to the manufacture of N-substituted cyclohexylamines; more particularly, it relates to the preparation of N-alkyl-substituted cyclohexylamine from phenol or cresol and an appropriate amine.

The products of the present invention have heretofore been made only by rather complicated procedures, mainly procedures involving expensive starting materials or costly process conditions such as high temperatures and high pressures. The alkylated cyclohexylamines of the present invention are useful as fuel oil additives, as rubber accelerators, as catalysts in the preparation of polyurethane foams, as rust inhibitors, or as textile modifiers. They are also useful in the synthesis of more complex organic compounds such as drugs.

It is an object of the present invention to provide a new and improved process for the manufacture of N-alkyl- and N,N-dialkylcyclohexylamines which may also be methyl-substituted in the alicyclic ring. Another object of the present invention is the commercial production of secondary and tertiary cyclohexylamines from inexpensive starting materials. It is a particular object to provide a method for the manufacture of N-substituted cyclohexylamines or methylcyclohexylamines from phenol or cresol. A further object is the provision of a simple process for making N-alkyl cyclohexylamines in good yields and under mild conditions.

These and other objects are accomplished by hydrogenating an equimolar mixture of phenol or cresol and an amine of the formula RNHR', wherein R is a straight or branched alkyl and wherein R' is hydrogen or a straight chain alkyl, with gaseous hydrogen at a temperature between 60° C. and 150° C. and at superatmospheric pressures in the presence of at least 0.02% of metallic rhodium or palladium, said amount of metal being based on the amount of phenol or cresol.

In a simple embodiment of the present invention, 1 mole of phenol and 1 mole of an alkylamine are hydrogenated in the presence of about 1% of catalytic metallic rhodium or palladium in a Parr shaker. The hydrogen pressure is kept between 15 and 70 p.s.i.g. and the temperature is kept between 60° and 150° C. When the calculated amount of hydrogen (3 moles) is absorbed by the mixture, the reaction ceases and the catalyst is filtered off. The filtrate can be worked up by conventional means such as fractionation, but surprisingly, it has been found that after eliminating the low-boiling components from the filtrate by distillation, the remaining undistilled portion represents the desired N-alkyl-substituted cyclohexylamine pure enough for most purposes. However, since occasionally some unreacted phenol may be found in the undistilled residue, it is recommended that a caustic wash be given to the product solution to eliminate the small amount of unreacted phenol, when the boiling point of the desired amine is close to that of phenol.

To better understand the present invention, reference is made to the following illustrative examples which are not intended to limit the invention. In these examples, as well as in the discussion following, all percentages given are percents by weight.

*Example 1.—N-n-butylcyclohexylamine*

(a) A pressure bottle of a large hydrogenation apparatus is loaded with 188.2 grams (2 moles) of phenol, 146.2 grams (2 moles) of n-butylamine and 12 grams of 5% palladium-on-carbon (0.32% metallic palladium). After the necessary purging of the air above the reaction mixture with nitrogen and subsequently with hydrogen, an initial hydrogen pressure of about 60 p.s.i.g. is applied and during the reaction this hydrogen pressure is kept between 37 and 64 p.s.i.g. The temperature is kept between 75° and 85° C. After about 6 hours, the hydrogen uptake ceases and the catalyst is filtered off. The filtrate is clear, but separates into two phases, of which the lower layer is very small and aqueous. A sample taken from the top layer is analyzed by gas chromatography to show 1.5% of cyclohexanol, 2.3% of other by-products and impurities, and 96.4% of N-n-butylcyclohexylamine.

(b) The catalyst is washed with a small portion of methanol and the wash liquor is added to the non-aqueous (top) phase. After driving off the methanol, this phase is fractionated, producing a forerun of 59 grams boiling between 95° and 205° C., a main fraction of 166 grams boiling between 205° and 207° C., and an after-run of 56 grams boiling between 207° and 210° C., leaving a residue of 14 grams. Analysis of the main fraction shows 0.01% of cyclohexanol, 2.1% of other by-products and impurities, and 97.9% of N-n-butylcyclohexylamine which represents a yield of 52.3% of the starting mixture. The after-run is also analyzed by gas chromatography and shows 0.3% of cyclohexanol, 0.8% of other by-products and impurities, and 98.9% of N-n-butylcyclohexylamine which represents 17.9% of theory. Thus, the total yield of N-n-butylcyclohexylamine based on the initial amount of phenol is 70.4% of theory.

(c) When the palladium catalyst in (a) is replaced by 0.42% of catalytic, metallic rhodium, the reaction mixture shows 1.0% of low-boiling components, 3.7% of other by-products and impurities, and 95.3% of N-n-butylcyclohexylamine.

*Example 2.—N-ethylcyclohexylamine*

A mixture of 47.1 grams of phenol, 35 grams of 70% ethylamine in water, and 4 grams of 5% palladium-on-carbon (0.42% metallic palladium) is hydrogenated by the process shown in Example 1 at a pressure of 43–63 p.s.i.g. and a temperature between 87° and 91° C. After 22 hours, the catalyst is filtered and the filtrate is dried overnight over sodium hydroxide and fractionated, producing 3 ml. of a forerun, 52.5 grams of a main fraction boiling at 153–158° C., and a small residue. Gas chromatographic analysis of the main fraction shows it to contain N-ethylcyclohexylamine in a purity of 99.8%, representing a yield of 82.5% of theory.

*Examples 3–8*

In the same manner as shown above, various other N-substituted cyclohexylamines are prepared from the amines listed in the table below, which also shows the product distribution obtained.

TABLE

| Ex. | Amine | C₆H₁₁OH, Percent | Other By-Products and Impurities, Percent | Product, Percent |
|---|---|---|---|---|
| 3 | i-C₄H₉NH₂ | 0.2 | 2.8 | 97.0 N-i-butylcyclohexylamine. |
| 4 | (C₂H₅)₂NH | 6.0 | 14.8 | 79.4 N,N-diethylcyclohexylamine. |
| 5 | n-C₃H₇NH₂ | 0.4 | 0.5 | 99.1 N-propylcyclohexylamine. |
| 6 | (n-C₃H₇)₂NH | 11.6 | 7.6 | 80.9 N,N-dipropylcyclohexylamine. |
| 7 | (n-C₄H₉)₂NH | 4.6 | 20.2 | 75.3 N,N-dibutylcyclohexylamine. |
| 8 | (CH₃)₂NH | 3.3 | 0.1 | 96.6 N,N-dimethylcyclohexylamine. |

In all these examples, hydrogen pressures between 22 and 70 p.s.i.g., temperatures between 60° and 150° C., and catalyst ratios of 0.2–0.5% metallic palladium are employed. In most instances, the reaction is completed in 6 hours. The percentage amounts indicated in the above table are those obtained by gas chromatographic analysis of the product solution obtained upon distillation after removal of the forerun. Thus, the figures given do not represent an actual yield which, in all instances, is between 70% and 87% of theory.

By following the above procedure but using between 0.3% and 0.5% metallic rhodium supported by carbon as the catalyst, product solutions containing 80.8% N,N-diethylcyclohexylamine, 94.3% N-i-butylcyclohexylamine, 96.2% N-n-butylcyclohexylamine, and 88.9% N-n-propylcyclohexylamine, respectively, are obtained by using the corresponding amines in the reaction mixture.

Example 9

By following the procedure of Example 1 with 27.1 grams of o-cresol and 14.8 grams of n-propylamine as the starting materials, and using 2 grams of 5% palladium on charcoal as the catalyst, the obtained reaction product after 27 hours of hydrogen pressures between 25 and 62 p.s.i.g. and temperatures between 92° and 127° C. is a two-phase system. The organic phase contains 88.5% 2-methyl - N - n-propylaminocyclohexylamine. The actual yield is 22 grams of the distilled product.

Example 10

In the manner of Example 9 and using the same amounts and parameters, 27.1 grams of p-cresol are converted to a product solution containing 81.2% of 4-methyl-N-n-propylcyclohexylamine. The reaction mixture also contains 11.7% of low-boiling components, and 6.1% of unreacted p-cresol.

It will be apparent to those skilled in the art that the present process provides for a simple method of making N-monoalkyl- and N,N - dialkylcyclohexylamines from phenol or cresol. The process can be carried out over a wide temperature range, namely from about 60° to 150° C. and over an extremely wide pressure range starting from slightly above atmospheric pressure or 15 p.s.i.g. to any desired high pressure. The above examples are shown to demonstrate the excellent yields obtained by using low pressures such as between 15 and 70 p.s.i.g. It will be apparent to those skilled in the art that higher pressures can be used, but no advantage is seen in carrying out the new process under high-pressure conditions, since such conditions would involve more expensive equipment, while the low pressures used in the above examples can be handled in the so-called low-pressure equipment such as Parr shakers, stirred tank reactors, stills, and the like.

The amount of catalyst used is of relatively low importance as long as a minimum of 0.02% by weight of metallic rhodium or palladium (based on the amount of phenol) is present. With larger catalyst amounts, the reaction proceeds considerably faster, but no advantage is seen in using more than about 2% of metallic palladium. The catalyst used in the present process can be supported by many conventional catalyst carriers such as charcoal, alumina, kieselguhr, asbestos, bentonite, and the like. The catalyst may also be unsupported and is then preferably added in finely divided form but not in colloidal form because when using colloidal size catalyst particles, elimination of such particles is much more difficult and requires special equipment or the aid of flocculating agents which, in turn, have to be eliminated from the filtrate.

It will be seen from the above definition for the present process that all kinds of mono- or disubstituted cyclohexylamines can be produced at an efficient reaction rate and with satisfactory yields. Among are products easily accessible by the present process are N-alkyl cyclohexylamine, wherein the alkyl can be straight-chained or branched, N,N-dialkylcyclohexylamine wherein one of the alkyls must be straight-chained, while the other may be straight or branched. Actually, the above process can also be used to make the secondary and tertiary amines defined above by using as a coreactant for the phenolic starting material an unsaturated amine, which during the process in the presence of the catalyst will become saturated.

The above process is directed to the use of palladium or rhodium as the catalyst. It is the selection of this catalyst which produces the high yields and the excellent reaction rates demonstrated above. With other noble metal catalysts, the desired amines are either not accessible at all or a product solution is obtained from which the desired secondary or tertiary amines can be separated only with great technical difficulties or very poor yields due to large quantities of by-products. As shown above, the filtrate obtained after conclusion of the hydrogenation does not need to be worked up by complicated procedures; a simple fractionation will produce high yields of a technically pure product.

It will also be seen from the above examples that water may be present during the reaction of the present process. This is of great importance in practice since many amines are available only with a certain water content, and in other instances, the introduction of the amine into the reaction vessel is considerably simplified when water can be used as a carrier liquid.

As apparent from the reaction equation of the present process, the amine and the phenol are used in equimolar amounts. However, such a ratio between reactants does not have to be observed since an excess of 20–50% of one reactant over the other does not adversely affect the process.

Others may practice the invention in any of the numerous ways which will be suggested to one skilled in the art by the present disclosure. All such practice of the invention is considered a part hereof provided it falls within the scope of the appended claims.

I claim:

1. The process of manufacturing an amine of the formula

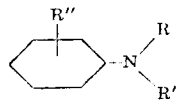

wherein R represents a member selected from the group consisting of straight-chain alkyl and branched alkyl, and wherein R' represents a member selected from the group consisting of hydrogen and straight-chain alkyl, and wherein R'' is a member selected from the group consisting of hydrogen and methyl, consisting essentially of the step of reacting a substantially equimolar mixture of an aromatic compound selected from the group consisting of cresol and phenol, and an amine of the formula RNHR', with gaseous hydrogen at a temperature between 60° and 150° C. and at a hydrogen pressure above 15 p.s.i.g. in the presence of at least 0.02% of catalyst selected from the group consisting of palladium and rhodium, said amount of catalyst being based on the amount of phenol.

2. The process of claim 1 wherein said hydrogen pressure is maintained between 15 and 70 p.s.i.g.

3. The process of claim 1 wherein the amine is a primary loweralkyl amine.

4. The process of claim 1 wherein said amine is a secondary loweralkyl amine.

5. The process of claim 1 wherein said catalyst is used in an amount of between 0.02 and 2.0 parts per 100 parts of said aromatic compound.

6. The process of claim 5 wherein said catalyst is palladium.

7. The process of claim 5 wherein said catalyst is rhodium.

8. The process of claim 5 wherein said aromatic compound is phenol.

References Cited

UNITED STATES PATENTS

| | | | |
|---|---|---|---|
| 1,982,985 | 12/1934 | Ernest et al. | 260—563 |
| 3,278,598 | 10/1966 | Markiewitz | 260—563 |

CHARLES B. PARKER, *Primary Examiner.*

N. WICZER, P. C. IVES, *Assistant Examiners.*